United States Patent
Kim et al.

(10) Patent No.: US 10,951,653 B2
(45) Date of Patent: Mar. 16, 2021

(54) APPARATUS INCLUDING SECURE COMPONENT AND METHOD OF PROVISIONING SECURITY INFORMATION INTO THE APPARATUS

(71) Applicant: SAMSUNG ELECTRONICS CO., LTD., Suwon-si (KR)

(72) Inventors: Jeong-tae Kim, Hwaseong-si (KR); Bo-gyeong Kang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 217 days.

(21) Appl. No.: 16/121,763

(22) Filed: Sep. 5, 2018

(65) Prior Publication Data

US 2019/0098052 A1   Mar. 28, 2019

(30) Foreign Application Priority Data

Sep. 22, 2017 (KR) .................. 10-2017-0122878
Feb. 13, 2018 (KR) .................. 10-2018-0018066

(51) Int. Cl.
| | |
|---|---|
| *H04L 29/00* | (2006.01) |
| *H04L 29/06* | (2006.01) |
| *H04L 9/32* | (2006.01) |
| *H04L 9/30* | (2006.01) |
| *H04L 9/08* | (2006.01) |

(52) U.S. Cl.
CPC .......... *H04L 63/166* (2013.01); *H04L 9/0897* (2013.01); *H04L 9/3073* (2013.01); *H04L 9/3268* (2013.01); *H04L 9/3273* (2013.01); *H04L 63/0485* (2013.01); *H04L 63/0823* (2013.01); *H04L 63/0869* (2013.01)

(58) Field of Classification Search
CPC ... H04W 12/06; H04W 4/80; H04W 12/0608; H04W 12/0609; H04W 12/08
See application file for complete search history.

(56) References Cited

U.S. PATENT DOCUMENTS

| | | | |
|---|---|---|---|
| 2008/0178006 A1* | 7/2008 | Mullor .................... | G06F 21/33 713/184 |
| 2010/0042848 A1* | 2/2010 | Rosener ................. | G06F 21/32 713/184 |
| 2015/0242614 A1 | 8/2015 | Scagnol et al. | |
| 2015/0348182 A1 | 12/2015 | Cismas et al. | |
| 2016/0006712 A1 | 1/2016 | Sade et al. | |
| 2016/0218875 A1 | 7/2016 | Le Saint et al. | |
| 2018/0144347 A1 | 5/2018 | Kim et al. | |

* cited by examiner

*Primary Examiner* — Ghazal B Shehni
(74) *Attorney, Agent, or Firm* — Sughrue Mion, PLLC

(57) ABSTRACT

An apparatus into which security information is provisioned through communication with a server may include: a communication interface receiving security data from the server; and a secure component including a secure storage and a controller storing the security information in the secure storage based on the security data. The communication interface may include a presentation layer handler performing mutual authentication between the apparatus and the server according to a first encryption protocol based on unique information assigned to the secure component, and an application layer handler requesting and receiving the security data to and from the server according to a second encryption protocol.

20 Claims, 9 Drawing Sheets

APPARATUS INCLUDING SECURE COMPONENT AND METHOD OF PROVISIONING SECURITY INFORMATION INTO THE APPARATUS

CROSS-REFERENCE TO RELATED APPLICATIONS

This application claims priority from Korean Patent Application No. 10-2017-0122878, filed on Sep. 22, 2017 in the Korean Intellectual Property Office, and Korean Patent Application No. 10-2018-0018066, filed on Feb. 13, 2018 in the Korean Intellectual Property Office, the disclosures of which are incorporated herein in their entireties by reference.

BACKGROUND

1. Field

Apparatuses and methods consistent with example embodiments relate to providing security information, and more particularly, an apparatus including a secure component and a method of providing security information to the apparatus.

2. Description of the Related Art

Security information that needs protection from an external threat of unauthorized access may be stored in an apparatus in various ways. For example, a user of a secure component may receive the secure component including the security information from a secure component supplier, or may provision the security information into the secure component during a production process of the apparatus with the secure component. In the former method, the security information may be securely included in the apparatus, but the security information of the secure component supplier may be inevitably exposed and it may not be easy to change the security information according to the change in the usage environment of the secure component. In the latter method, the security information may be relatively easily changed, but protection of the security information against improper access from the outside of the apparatus may be more difficult due to an interface for provisioning the security information. In addition, the security information may require renewal or modified while the apparatus is being used by a user of the apparatus.

SUMMARY

One or more example embodiments provide an apparatus and method of securely provisioning security information protected from unauthorized access into the apparatus from an external source.

According to an aspect of an example embodiment, there is provided an apparatus into which security information is provisioned through communication with a server. The apparatus may include a communication interface receiving security data from the server, and a secure component including a secure storage and a controller storing the security information in the secure storage based on the security data. The communication interface may include a presentation layer handler performing mutual authentication between the apparatus and the server according to a first encryption protocol based on unique information of the secure component, and an application layer handler requesting and receiving the security data to and from the server according to a second encryption protocol.

According to an aspect of an example embodiment, there is provided a method of provisioning security information into an apparatus including a secure component through communication with a server. The method may include: obtaining unique information that is assigned to the secure component; performing mutual authentication between the apparatus and the server based on the unique information according to a first encryption protocol; requesting security data from the server according to a second encryption protocol; receiving the security data from the server according to the second encryption protocol; and storing the security information in the secure component based on the received security data.

According to an aspect of an example embodiment, there is provided a method of provisioning security information into an apparatus through communication between a server and the apparatus. The method may include: preparing, by the server, security data; mutually authenticating the server and the apparatus according to a first encryption protocol based on unique information assigned to a secure component included in the apparatus; requesting, by the apparatus, for the security data according to a second encryption protocol; transmitting, by the server, the security data to the apparatus according to the second encryption protocol; and storing, by the apparatus, the security information in the secure component based on the security.

BRIEF DESCRIPTION OF THE DRAWINGS

The above and/or other aspects will be more clearly understood from the following detailed description of example embodiments, taken in conjunction with the accompanying drawings in which.

DETAILED DESCRIPTION

Figure 1:
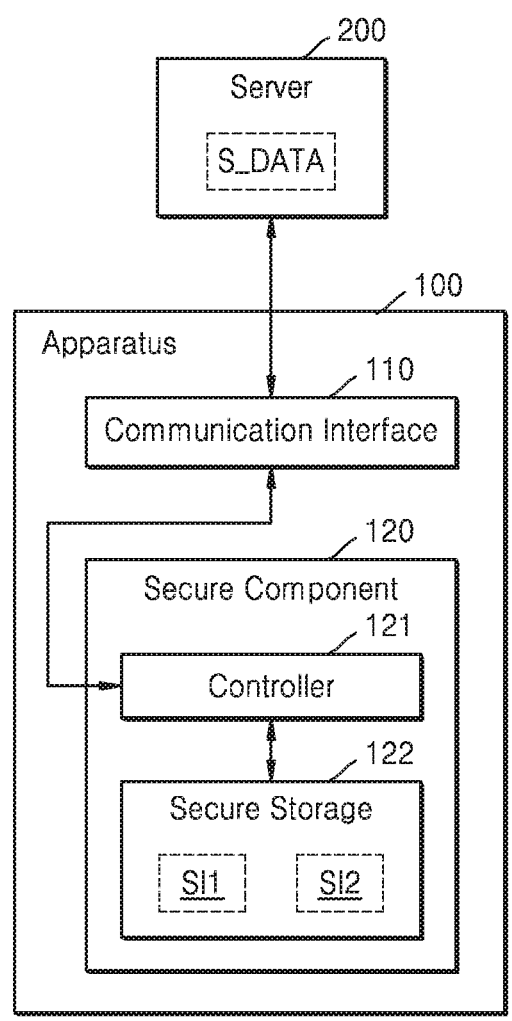
FIG. 1 is a block diagram illustrating an apparatus and a server according to an example embodiment.

Reference will now be made in detail to example embodiments, with reference to the accompanying drawings. In the drawings, parts irrelevant to the description are omitted to clearly describe the example embodiments, and like reference numerals refer to like elements throughout the specification. In this regard, the present example embodiments may have different forms and should not be construed as being limited to the descriptions set forth herein.

Throughout the specification, when a component "includes" an element, unless there is another opposite description thereto, it should be understood that the component does not exclude another element but may further include another element.

As used herein, the term "and/or" includes any and all combinations of one or more of the associated listed items. Expressions such as "at least one of," when preceding a list of elements, modify the entire list of elements and do not modify the individual elements of the list.

Hereinafter, the present disclosure is described in detail with reference to the accompanying drawings.

FIG. 1 is a block diagram illustrating an apparatus 100 and a server 200 according to an example embodiment. As illustrated in FIG. 1, the apparatus 100 may receive security data S_DATA from the server 200 through communication with the server 200.

The apparatus 100, as an entity including a secure component 120 that stores and processes security information (e.g., first security information SI1 and second security information SI2), may respond to an external request such as an authentication request based on the security information. The apparatus 100 may be, as non-limiting examples, a standalone computing device such as a personal computer, a network server, a tablet personal computer (PC), an e-book reader, a personal digital assistant (PDA), a portable multimedia player (PMP), a mobile phone, a computing device, and a wearable device, or any object that provides a specific function, such as an automobile, a machine, a production facility, a door, and an illuminator. As illustrated in FIG. 1, the apparatus 100 may include a communication interface 110 and the secure component 120. Each of the communication interface 110 and the secure component 120, as components included in the apparatus 100, may include a logic block designed through logic synthesis or the like, and a software block executable by a processor.

The apparatus 100 may communicate via communication interface therein with another device such as the server 200 or another device similar to the apparatus 100. For example, the apparatus 100 may connect, via the communication interface 110, to a mobile communication system such as a long term evolution (LTE) system, a code division multiple access (CDMA) system, and a global system for mobile communications (GSM) system, or to a communication network such as a wide area network (WAN), a local area network (LAN), and a wireless local area network (WLAN), or to Internet of things (IoT). In some example embodiments, the communication interface 110 may support one or more communication methods. In the following, the apparatus 100 may be referred to as a client communicating with the server 200.

The security information (e.g., the first and second security information SI1 and SI2) may include personal information about a user of the apparatus 100 and may include at least one of an identifier (ID) of the apparatus 100, supplier information of the apparatus 100, a certificate, a private key, and a pre-shared key (PSK). Information about authentication of the apparatus 100 included in the security information may be used for operations requiring authentication of the apparatus 100, such as, as non-limiting examples, a remote operation of the apparatus 100 and software upgrade.

For example, when the apparatus 100 accesses the IoT via the communication interface 110, reliability of information received through transmission of information obtained by the apparatus 100 itself or information received from the outside via the communication interface 110 may be based on authentication of the apparatus 100. Accordingly, the security information may need to be safely protected from unauthorized access from the outside of the apparatus 100 to prevent the security information from being exposed, deleted or altered by unjustified attempts. In some example embodiments, the security information may be, for example, personal information (e.g., name, photo, age, address, social security number, etc.), usernames, passwords, proprietary information, encryption keys, authentication certificates, etc.

The secure component 120 may include, as illustrated in FIG. 1, a controller 121 and a secure storage 122, and the security information may be stored in the secure storage 122. The secure storage 122 may be a non-volatile memory that does not lose data stored therein even when power supplied thereto is interrupted, and may include, as non-limiting examples, electrically erasable programmable read-only memory (EEPROM), a flash memory, phase change random access memory (RRAM), nano floating gate memory (NFGM), polymer random access memory (PoRAM), magnetic random access memory (MRAM), and ferroelectric random access memory (FRAM).

When the security information is provisioned (or stored) into the secure component 120 at a production stage of the secure component 120, the need for a user of the secure component 120 (e.g., a supplier or a producer of the apparatus 100) to interface with the secure component 120 may be reduced, and production efficiency of the secure component 120 of a supplier of the secure component 120 may also be reduced. For example, when the apparatus 100 needs to be prepared to suit various usage environments such as a case when the apparatus 100 is connected to the IoT via the communication interface 110, the utilization of the secure component 120 by the user of the secure component 120 may be reduced due to a fact that changing the security information included in the secure component 120 is not easy. In addition, in terms of the supplier of the secure component 120, the production efficiency of the secure component 120 by the supplier (or a producer) of the secure component 120 may be reduced due to a process of provisioning the security information, preparation of the secure component 120 into which the security information has been provisioned, or the like.

Addition and/or modification of the security information may be required not only during a production process but also after the apparatus 100 is provided to the user of the apparatus 100 by the user of the secure component 120. The production process may refer to a process of manufacturing the apparatus 100 prior to the shipment of the apparatus 100 from its factory. For example, when the security information includes a certificate, the certificate may be required to be updated periodically, and thus it may be required to provision new security information into the apparatus 100. For example, as illustrated in FIG. 1, the secure component 120 may include the first and second security information SI1 and SI2, and the second security information SI2 may include the security information provisioned into the apparatus 100 after shipment of the apparatus 100.

As described below, according to the apparatus 100 and a method of provisioning the security information according to an example embodiment, the security information may be securely provisioned into the secure component 120 (e.g., after shipment of the secure component 120), which, as a result, may be advantageous to both the user and the supplier of the secure component 120 as well as the user of the apparatus 100. In this specification, the supplier of the secure component 120 may include a producer of the secure component 120 who supplies the secure component 120. In this specification, the user of the secure component 120 may include the supplier and/or the producer of the apparatus 100 who supplies the apparatus 100 by using the secure component 120, and may include a developer (e.g., through customization) and/or the user using the apparatus 100 including the secure component 120. In addition, in this specification, the user of the apparatus 100 may include the user of the apparatus 100 provided by the supplier of the apparatus 100.

The server 200 may provide to the apparatus 100 security data S_DATA that includes the security information or is generated from the security information. To provision the security information, the server 200 may be operated by the user of the secure component 120, for example, by the supplier of the apparatus 100 or by an operator of the server 200 designated by the supplier of the apparatus 100. For example, the server 200 may provide the security data S_DATA during a production process of the apparatus 100, or after the apparatus 100 is shipped. As described with reference to FIG. 2, the apparatus 100 and the server 200 may communicate according to communication protocols corresponding to a plurality of layers, and the security data S_DATA may be provided from the server 200 to the apparatus 100 according to an encryption protocol. In some example embodiments, the server 200 may obtain the security information and may generate the security data S_DATA by encrypting the security information. The controller 121 of the secure component 120 may receive the security data S_DATA from the server 200 via the communication interface 110 and may store in the secure storage 122 the security information (e.g., second security information SI2) from the security data S_DATA.

The secure component 120 may include unique information, and the unique information of the secure component 120 may be uniquely assigned to the secure component 120 and be different from unique information of other secure components. In some example embodiments, the unique information of the secure component 120 may be provisioned into the secure component 120 by the supplier of the secure component 120 (e.g., during the production process of the secure component 120). In some example embodiments, the unique information of the secure component 120 may be provisioned into the secure component 120 by the user of the secure component 120 (e.g., in the production process of the apparatus 100). In some example embodiments, the unique information of the secure component 120 may include at least one of a certificate, a private key, and a pre-shared key (PSK).

The unique information of the secure component 120 may be stored in the secure storage 122 as the first security information SI1 in some example embodiments. The controller 121 may acquire the first security information SI1 as the unique information of the secure component 120 and provide the first security information SI1 to the communication interface 110. The communication interface 110 may perform mutual authentication with the server 200 according to the encryption protocol based on the first security information SI1. In some example embodiments, the unique information may be included in the controller 121.

As described below with reference to drawings, since the unique information of the secure component 120 is used for mutual authentication between the apparatus 100 and the server 200, transmission of information, for example, the ID and/or a password of the apparatus 100 may be omitted, and thus, an exposure of such information may be prevented so that a high security level of transmitting the security data S_DATA to the apparatus 100 may be achieved. Hereinafter, the first security information SI1 may be referred to as the unique information of the secure component 120 and the second security information SI2 may be referred to as new security information.

Figure 2:
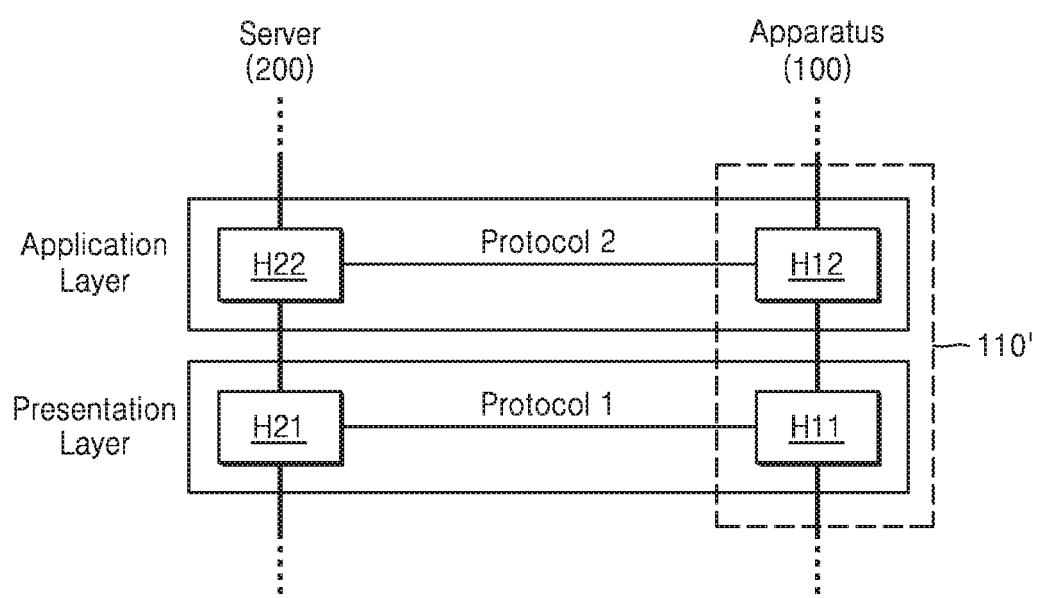
FIG. 2 is a diagram illustrating a protocol stack of communication between the apparatus and the server of FIG. 1 according to an example embodiment.

FIG. 2 is a diagram illustrating a protocol stack of communication between the apparatus 100 and the server 200 of FIG. 1 according to an example embodiment. FIG. 2 illustrates some layers, namely, a presentation layer and an application layer, in the protocol stack of communication between the apparatus 100 and the server 200. Hereinafter, FIG. 2 will be described with reference to FIG. 1.

Referring to FIG. 2, the apparatus 100 and the server 200 may communicate with each other according to a first protocol on the presentation layer, and communicate with each other according to a second protocol on the application layer which is an upper layer of the presentation layer. The presentation layer may perform translation between codes and eliminate a burden of processing different codes from the application layer by handling format differences in data. In some example embodiments, the first protocol defined on the presentation layer may be a transport layer security (TLS) protocol as an encryption protocol. The TLS protocol may be used to form a safe and secure channel of communication between the application layer and a transmission control protocol (TCP) transmission layer, and as described below, an enrollment over secure transport (EST) protocol may use the TLS protocol on a lower layer protocol.

The application layer may be related to an application process and perform an application service. For example, the application layer may interact with a software application, and functions of the application layer may include identification of a communication counterpart, determination of available resources, synchronization of communication, and the like. In some example embodiments, the second protocol defined on the application layer may be the EST protocol as an encryption protocol. The EST protocol may be referred to as an encryption protocol used to manage certificates for public key infrastructure (PKI) clients in need of client certificates and certificate authority (CA) certificates. The EST protocol may use TLS authentication for authentication of the server 200 and the client, and the server 200 and the client may be mutually authenticated by TLS handshaking.

The EST protocol may define TLS-based server authentication and TLS-based client authentication, and may also define certificate-less TLS mutual authentication. In case of the TLS mutual authentication without certificates, the server 200 and the client may negotiate a certificate-less cipher suite without certificates for the mutual authentication. To this end, the client may request or receive, for example, the ID and/or the password from the server 200. Referring to FIG. 1, the secure component 120 may include the unique information, and the apparatus 100 may exclude the certificate-less TLS mutual authentication by using the unique information of the secure component 120 and performing the TLS-based client authentication defined in the EST protocol. Accordingly, the mutual authentication between the server 200 and the apparatus 100 may be completed and the security data S_DATA may be securely provided to the apparatus 100.

Referring to FIG. 2, as an example of the communication interface 110 in FIG. 1, a communication interface 110' in FIG. 2 may include a first handler H11 and a second handler H12. The first handler H11 may be referred to as a presentation layer handler and may perform mutual authentication with the server 200 according to the first protocol (or first encryption protocol) based on the unique information of the secure component 120. In addition, the second handler H12 may also be referred to as an application handler and may request the security data S_DATA from the server 200 according to the second protocol (or the second encryption protocol). As illustrated in FIG. 2, the server 200, similar to the apparatus 100, may also include a first handler H21 and a second handler H22 that perform communication according to the first protocol and the second protocol, respectively. In the following description, it is assumed that the first protocol of the presentation layer is the TLS protocol and the second protocol of the application layer is the EST protocol, but the example embodiments are not limited thereto and the first and second protocols may be any other protocols.

Figure 3:
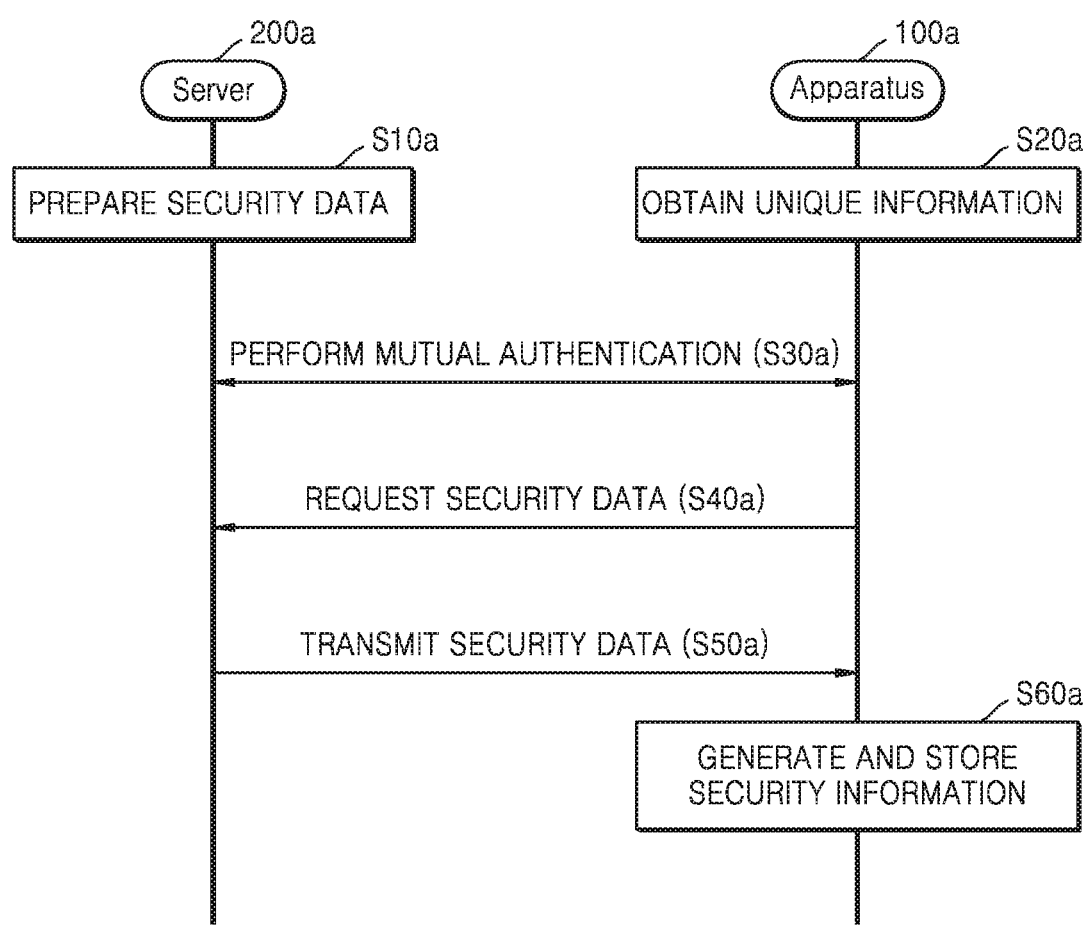
FIG. 3 is a diagram illustrating an operation of provisioning the security information according to a flow of time according to an example embodiment.

FIG. 3 is a diagram illustrating an operation of provisioning the security information according to a flow of time according to an example embodiment. FIG. 3 illustrates internal operations of an apparatus 100a and a server 200a, and signals transmitted between the apparatus 100a and the server 200a according to the flow of time. In some example embodiments, the apparatus 100a of FIG. 3, similar to the apparatus 100 in FIG. 1, may include the communication interface 110 and the secure component 120, and the secure component 120 may include the controller 121 and the secure storage 122. Hereinafter, FIG. 3 will be described with reference to FIGS. 1 and 2. The apparatus 100a may be an example of the apparatus 100 and in the present disclosure, the apparatus 100 and the apparatus 100a may be interchangeable. Similarly, the server 200 and the server 200a may be interchangeable.

The server 200a may prepare security data S_DATA (S10a). The security data S_DATA may be data to be transmitted to the apparatus 100a, and may include the security information or be generated from the security information. For example, the server 200a may generate the security data S_DATA by encrypting the security information. Examples of operation S10a will be described below with reference to FIGS. 4A and 4B.

The apparatus 100a may obtain the unique information (S20a). As described above with reference to FIG. 1, the unique information may be stored in the secure component 120 and may be different from the unique information stored in other secure components. For example, the controller 121 may read the first security information SI1 as the unique information from the secure storage 122.

The apparatus 100a and the server 200a may perform the mutual authentication (S30a). In some example embodiments, the apparatus 100a and the server 200a may perform the mutual authentication according to the first encryption protocol of the presentation layer, for example, the TLS handshaking. In the TLS handshaking, the apparatus 100a may use the unique information obtained in operation S20a for authentication of the apparatus 100a. For example, the unique information may include at least one of the certificate and the key pair, and the apparatus 100a may use this unique information for the server 200a to authenticate the apparatus 100a. Accordingly, the TLS mutual authentication without the certificate defined in the EST protocol may be excluded.

The apparatus 100a may request the security data S_DATA from the server 200a (S40a). In some example embodiments, the communication interface 110 may request the security data S_DATA according to the second encryption protocol of the application layer, for example, the EST protocol.

The server 200a may transmit the security data S_DATA (S50a). In some example embodiments, the server 200a may transmit the security data S_DATA in response to the request in operation S40a according to the second encryption protocol of the application layer, for example, the EST protocol. The communication interface 110 of the apparatus 100a may receive the security data S_DATA from the server 200a and may transmit the security data S_DATA to the controller 121.

The apparatus 100a may perform operations of generating and storing the unique information (S60a). For example, the controller 121 may generate the security information by decrypting the security data S_DATA received in operation S50a and may store the security information in the secure storage 122.

Figure 4A:
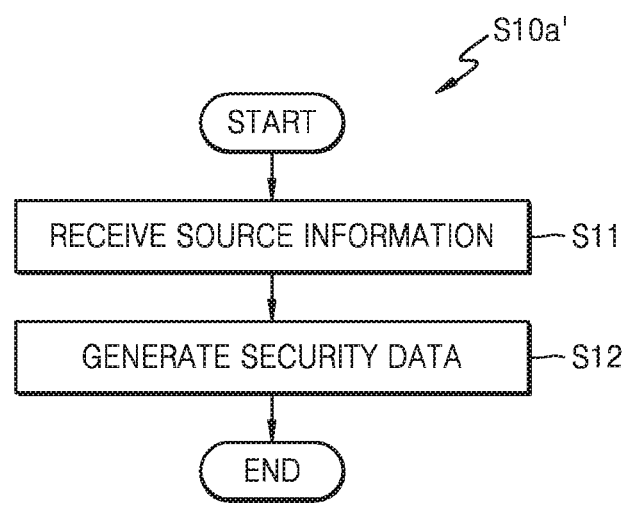
FIGS. 4A and 4B are flowcharts for explaining examples of operation S10a of FIG. 3 according to an example embodiment.
Figure 4B:
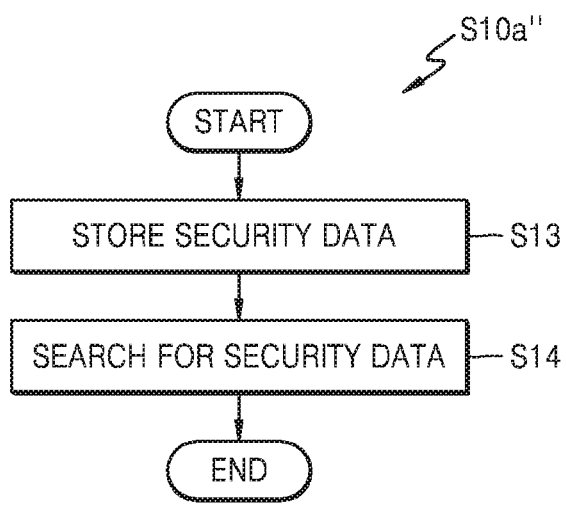

FIGS. 4A and 4B are flowcharts for explaining examples of operation S10a of FIG. 3 according to an example embodiment. As described above with reference to FIG. 3, the server 200a may prepare the security data S_DATA in operations S10a' and S10a" of FIGS. 4A and 4B, respectively. Hereinafter, FIGS. 4A and 4B are described with reference to FIG. 1, and duplicate descriptions with reference to FIGS. 4A and 4B are omitted.

Referring to FIG. 4A, operation S10a' may include operations S11 and S12. An operation of receiving source information may be performed (S11). For example, the user of the secure component 120 may provide to the server 200 the source information as the security information to be provisioned into the apparatus 100. The source information may include at least one of, for example, a key used for encrypting the security information, a key used for authentication of the apparatus 100, the certificate, and the key pair.

An operation of generating the security data S_DATA may be performed (S12). For example, the server 200 may generate the security data S_DATA by encrypting at least a portion of the source information received in operation S11. Accordingly, the server 200 may prepare the security data S_DATA and provide the security data S_DATA to the apparatus 100 in response to a request of the apparatus 100.

Referring to FIG. 4B, operation S10a" may include operations S13 and S14. Compared with operation S10a' of FIG. 4A, operation S10a" of FIG. 4B may store the security data S_DATA in advance. For example, operation S10a' of FIG. 4A may be performed when the security data S_DATA is generated, to provision the new security information after shipment of the apparatus 100, from the source information provided by the user of the secure component 120 corresponding to the new security information. In addition, for example, operation S10a" of FIG. 4B may be performed when the security data S_DATA that has been stored in advance in the server 200 operated by the user of the secure component 120 is transmitted during the production process of the apparatus 100 by the producer of the apparatus 100 who may be different from the user of the secure component 120. In other words, the security data S_DATA may be transmitted to the apparatus 100 without the risk of exposing the security information of the producer of the apparatus 100 to other users.

An operation of storing the security data S_DATA may be performed (S13). For example, the server 200 may include a storage and may store the security data S_DATA in the storage. The security data S_DATA stored in the storage may be obtained from the user of the secure component 120 outside the server 200, or may be generated in the server 200 from the source information provided by the user of the secure component 120.

An operation of searching for the security data S_DATA may be performed (S14). For example, the server 200 may search for the security data S_DATA to be transmitted to the apparatus 100 among the data stored in the storage. In some example embodiments, the data stored in the storage may be encrypted data of the security data S_DATA and thus the security data S_DATA may be generated by decrypting the discovered security data.

Figure 5:
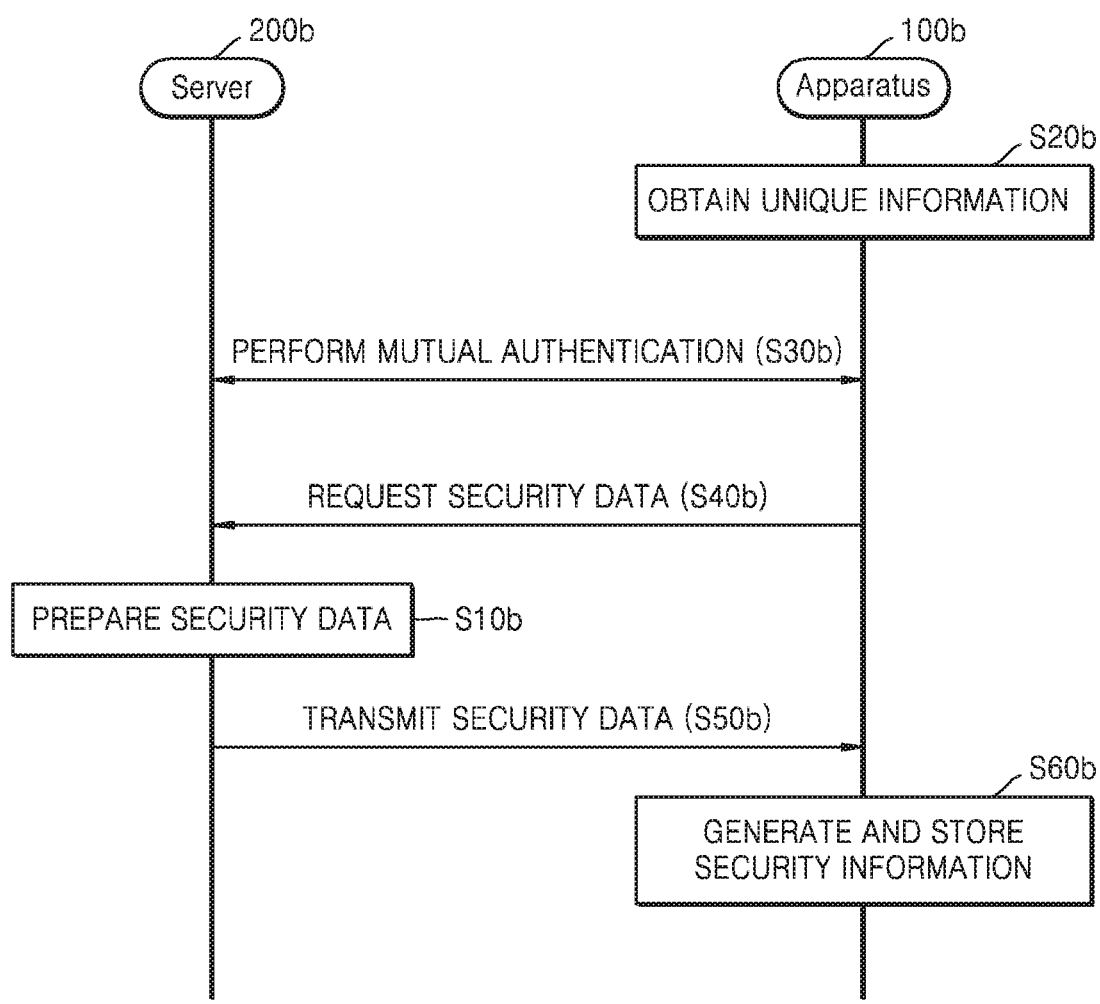
FIG. 5 is a diagram illustrating an operation of provisioning the security information according to a flow of time according to an example embodiment.

FIG. 5 is a diagram illustrating an operation of provisioning the security information according to the flow of time according to an example embodiment. The security data S_DATA may be prepared in a server 200*b* in response to the request for the security data S_DATA of an apparatus 100*b* in an example of FIG. 5, compared with the example of FIG. 3. In some example embodiments, the apparatus 100*b* in FIG. 5, similar to the apparatus 100 in FIG. 1, may include the communication interface 110 and the secure component 120, and the secure component 120 may include the controller 121 and the secure storage 122. Hereinafter, FIG. 5 is described with reference to FIG. 1 and FIG. 2, and descriptions overlapping those given with reference to FIG. 3 are omitted. The apparatus 100*b* may be an example of the apparatus 100 and in the present disclosure, the apparatus 100 and the apparatus 100*b* may be interchangeable. Similarly, the server 200 and the server 200*b* may be interchangeable.

The apparatus 100*b* may obtain the unique information (S20*b*). As described above, the unique information may be provisioned into the secure component 120 in the production process of the secure component 120, or may be provisioned into the secure component 120 in the production process of the apparatus 100*b*.

The apparatus 100*b* and the server 200*b* may perform the mutual authentication (S30*b*). In some example embodiments, the apparatus 100*b* and the server 200*b* may mutually authenticate according to the TLS handshaking, and the unique information obtained in operation S20*b* may be used in the TLS handshaking. Accordingly, the apparatus 100*b* and the server 200*b* may perform the mutual authentication by using respective certificates.

The apparatus 100*b* may request the security data S_DATA from the server 200*b* (S40*b*). In some example embodiments, the apparatus 100*b* may request the security data S_DATA by transmitting a certificate signing request (CSR) to the server 200*b* according to the EST protocol. An example of an operation in which the apparatus 100*b* requests the security data S_DATA is described below with reference to FIG. 8.

The server 200*b* may prepare the security data S_DATA (S10*b*). The server 200*b* may prepare the security data S_DATA in response to the request for the security data S_DATA from the apparatus 100*b*, instead of preparing the security data S_DATA in advance as illustrated in the example of FIG. 3. An example of operation S10*b* is described below with reference to FIG. 6.

The server 200*b* may transmit the security data S_DATA (S50*b*). In some example embodiments, the server 200*b* may transmit the security data S_DATA according to the EST protocol. Next, the apparatus 100*b* may generate and store the security information (S60*b*). In some example embodiments, the controller 121 may generate the security information by decrypting the security data S_DATA and store the security information in the secure storage 122.

Figure 6:
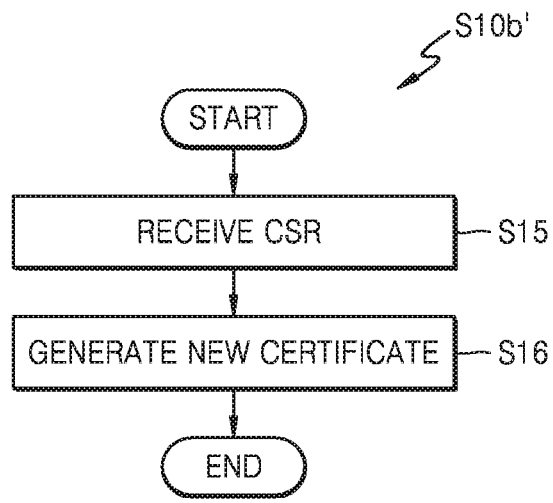
FIG. 6 is a diagram illustrating an example of operation S10b of FIG. 5 according to an example embodiment.

FIG. 6 is a diagram illustrating an example of operation S10*b* of FIG. 5 according to an example embodiment. As described above with reference to FIG. 5, an operation of preparing the security data S_DATA of FIG. 6 may be performed (S10*b*'). Operation S10*b*' of FIG. 6 may be performed in response to the CSR received from the apparatus 100*b* in operation S40*b* of FIG. 5. As illustrated in FIG. 6, operation S10*b*' may include operations S15 and S16, and hereinafter, FIG. 6 is described with reference to FIG. 5.

The server 200*b* may receive the CSR (S15). For example, referring to FIG. 5, after the mutual authentication between the apparatus 100*b* and the server 200*b* is completed, the server 200*b* may receive the request for the security data S_DATA from the apparatus 100*b*, and the request for the security data S_DATA may include the CSR.

The server 200*b* may generate a new certificate (S16). For example, the server 200*b* may generate the new certificate in response to the CSR received in operation S15, for example, based on the source information described above with reference to FIG. 4A. Next, in operation S50*b* in FIG. 5, the server 200*b* may transmit the security data S_DATA including the new certificate to the apparatus 100*b*. In some example embodiments, the CSR received in operation S15 may include the public key, and the security data S_DATA may be generated by encrypting the public key in which the new certificate is included in the CSR.

Figure 7:
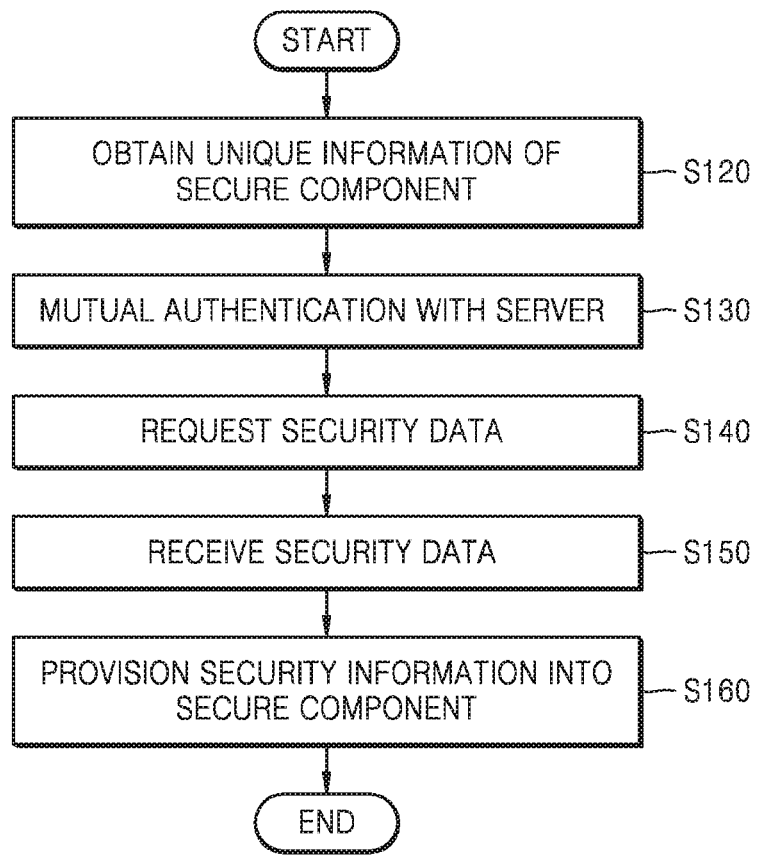
FIG. 7 is a flowchart for explaining a method of provisioning the security information according to an example embodiment.

FIG. 7 is a flowchart for explaining a method of provisioning the security information according to an example embodiment. FIG. 7 illustrates the operations performed by the apparatus 100 of FIG. 1 to provision the security information and the operations may correspond to, for example, the operations of the apparatuses 100*a* and 100*b* in the examples of FIGS. 3 and 5. Hereinafter, FIG. 7 is described with reference to FIG. 1.

The apparatus 100*b* may obtain the unique information of the secure component 120 (S120). For example, as described above with reference to FIG. 1, the unique information may be stored as the first security information SI1 in the secure storage 122, and the controller 121 may obtain the first security information SI1 from the secure storage 122.

The mutual authentication may be performed with the server 200 (S130). The communication interface 110 may perform the mutual authentication with the server 200 according to the first encryption protocol of the presentation layer, for example, the TLS protocol. For example, the communication interface 110 (or the second handler H11 in FIG. 2) may perform negotiation, the authentication, and the TLS handshaking including secure channel formation. The controller 121 may provide the unique information obtained in operation S120 to the communication interface 110, and the communication interface 110 may perform the TLS handshaking based on the unique information. For example, the unique information may include at least one of the certificate and the key pair, the communication interface 110 may provide at least a portion of the unique information to the server 200, and the server 200 may authenticate the apparatus 100. Similarly, the communication interface 110 may authenticate the server 200 by using the certificate provided by the server 200. Accordingly, as described above, the certificate-less TLS mutual authentication defined by the EST protocol may be excluded.

The apparatus 100*b* may request the security data S_DATA (S140). The communication interface 110 may request to the server 200 to transmit the security data S_DATA according to the second encryption protocol of the application layer, for example, the EST protocol.

An operation of receiving the security data S_DATA may be performed (S150). The communication interface 110 may receive from the server 200 the security data S_DATA according to the second encryption protocol of the application layer, for example, the EST protocol. The security data S_DATA may include the security information encrypted by the server 200. The communication interface 110 may transmit the security data S_DATA to the controller 121.

The apparatus 100*b* may provision the security information into the secure component 120 (S160). The controller 121 may receive the security data S_DATA from the communication interface 110 and may generate the security information from the security data S_DATA. For example, the controller 121 may generate the security information by decrypting the security data S_DATA and store the security information in the secure storage 122.

Figure 8:
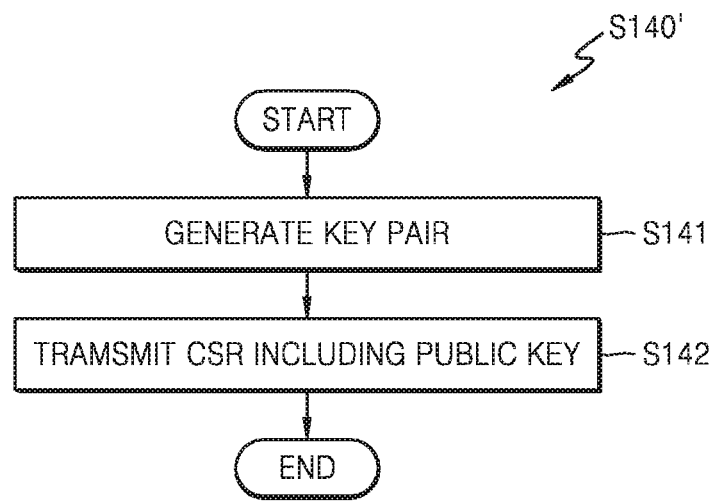
FIG. 8 is a diagram illustrating an example of operation S140 of FIG. 7 according to an example embodiment.

FIG. 8 is a diagram illustrating an example of operation S140 of FIG. 7 according to an example embodiment. Operation S140' of FIG. 8 may correspond to the example of operation S40*b* in which the apparatus 100*b* requests the security data S_DATA in the example of FIG. 5. As illustrated in FIG. 8, the apparatus 100*b* may provide the CSR to the server 200*b* and operation S140' may include operations S141 and S142. Hereinafter, FIG. 8 is described with reference to FIGS. 5 and 7.

The apparatus 100*b* may generate the key pair (S141). In the EST for a PKI system, the apparatus 100*b*, for example, the controller 121 may generate the key pair that includes a public key and a private key before generating the CSR. In some example embodiments, the controller 121 may further generate the PSK.

The apparatus 100*b* may transmit the CSR including the public key (S142). For example, the controller 121 may provide the public key generated in operation S141 to the communication interface 110, and the communication interface 110 may provide the CSR including the public key to the server 200*b*.

After operation S140' of FIG. 8 is performed, for example, in operation S150 in FIG. 7, the communication interface 110 may receive the security data S_DATA including the new certificate from the server 200*b*. Next, for example, in operation S160 of FIG. 7, the controller 121 may generate the security information including the new certificate and the key pair generated in operation S141, and store the security information in the secure component 120, for example, in operation S160 of FIG. 7.

Figure 9:
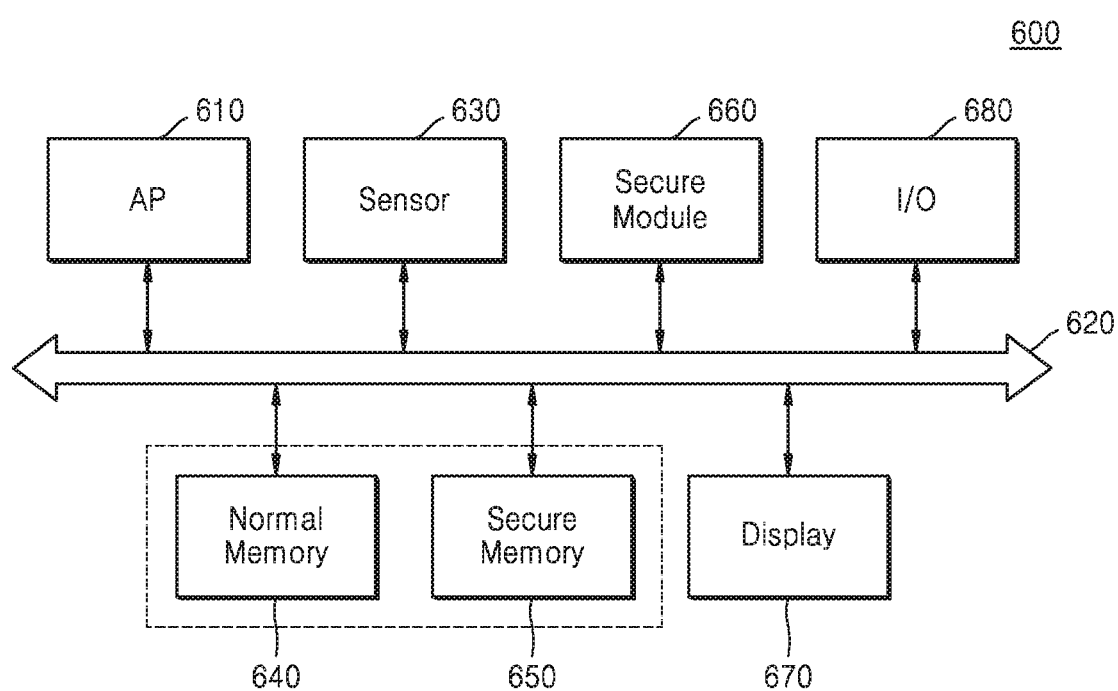
FIG. 9 is a block diagram illustrating an example of the apparatus in FIG. 1 according to an example embodiment.

FIG. 9 is a block diagram illustrating an example of the apparatus 100 in FIG. 1 according to an example embodiment. As illustrated in FIG. 9, an IoT device 600, as the apparatus 100 in FIG. 1, may be connected to the IoT, and may include an application processor 610, a bus 620, a sensor 630, a normal memory 640, a secure memory 650, a secure module 660, a display 670, and an input/output interface 680. Components 610 and 630 through 680 of the IoT device 600 may be connected to the bus 620 and exchange data with each other via the bus 620.

The IoT may be referred to as a network of objects using wired/wireless communication. For example, the IoT may be referred in various terms such as an IoT network system, a ubiquitous sensor network (USN) communication system, a machine type communications (MTC) communication system, a machine oriented communication (MOC) system, a machine to machine (M2M) communication system, and a device to device (D2D) system.

The application processor 610 may control an overall operation of the IoT device 600. For example, the application processor 610 may execute applications that provide Internet browsers, games, animations, and the like. In one example embodiment, the application processor 610 may include one or more cores. For example, the application processor 610 may be a multi-core processor such as a dual-core processor, a quad-core processor, a hexa-core processor, and an octa-core processor. In addition, the application processor 610 may further include a cache memory.

The sensor 630 may sense an external environment of the IoT device 600. In one example embodiment, the sensor 630 may be an image sensor, and may generate image information and provide the generated image information to the application processor 610. In another example embodiment, the sensor 630 may be a biosensor sensing biometric information, and may generate sensing data, as a non-limiting example, that corresponds to information sensed by sensing fingerprints, iris patterns, bloodline patterns, heart rates, blood sugar levels, or the like. In some example embodiments, the sensor 630 may include any sensor such as a luminance sensor, an acoustic sensor, and an acceleration sensor.

The normal memory 640, as distinguished from the secure memory 650, may store data necessary for an operation of the IoT device 600. For example, the normal memory 640 may include a volatile memory device such as dynamic random access memory (DRAM), static random access memory (SRAM), and/or a nonvolatile memory device such as a flash memory device and a solid state drive (SSD).

The secure memory 650 may offer a higher level of security than the normal memory 640 and store data that requires a higher level of protection during the operation of the IoT device 600. For example, the secure memory 650, similar to the secure storage 122 in FIG. 1, may store the security information (e.g., the second security information SI2 in FIG. 1) for the IoT device 600 that requires protection from an unauthorized access form an external source. In some example embodiments, the secure memory 650 may store data sensed via the sensor 630, for example, data including biometric information. Although the normal memory 640 and the secure memory 650 are illustrated separately in FIG. 9, the present disclosure is not limited thereto. The normal memory 640 and the secure memory 650 may be implemented as one combined physical memory. In some example embodiments, the normal memory 640 and/or the secure memory 650 may be detachably coupled with the IoT device 600. For example, the normal memory 640 and/or the secure memory 650 may be connected to the IoT device 600 by using a connector pin and/or a socket, or the like and be removable from the IoT device 600.

The secure module 660 may include the unique information of the secure module 660 and may manage the secure memory 650. The secure module 660 may receive the security data from a mutually authenticated server by using the unique information, and generate the security information from the security data. In addition, the secure module 660 may store in the secure memory 650 data requiring security in the operation of the IoT device 600, or read data from the secure memory 650. In addition, in some embodiments, the secure module 660 may generate the security information from the security data received from the outside and may generate the key pair. The secure module 660 may include a logic block designed by logic synthesis, and also include a processor and a software block executed by the processor.

The display 670 may output data. For example, the display 670 may output image data sensed by using the sensor 630, or output computed data by using the application processor 610.

The input/output interface 680 may include a component to receive an input of a user of the IoT device 600. For example, the input/out interface 680 may include a touch pad, a keypad, and/or an input button. The input/output interface 608 may also include a component to output a signal such as a light-emitting diode (LED). In addition, the input/output interface 680 may include a communication module and may provide layered communication with an entity outside the IoT device 600, for example, a server.

Figure 10:
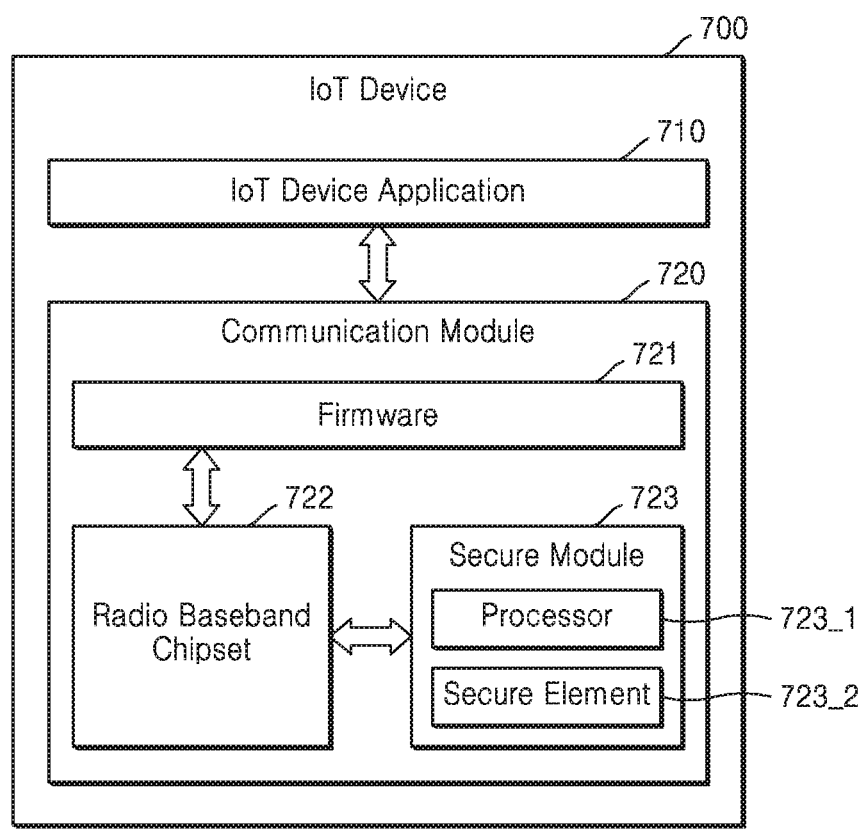
FIG. 10 is a block diagram illustrating an example structure of hardware and software of an Internet of things (IoT) device of FIG. 9 according to an example embodiment.

FIG. 10 is a block diagram illustrating an example structure of hardware and software of the IoT device 600 of FIG. 9 according to an example embodiment. As illustrated in FIG. 10, the IoT device 700 may include an IoT device application 710 and a communication module 720, and the communication module 720 may include firmware 721, a wireless baseband chipset 722, and a secure module 723.

The IoT device application 710 may control the communication module 720 as a software block and may be executed by a central processing unit (CPU) of the IoT device 700 (e.g., the application processor 610 in FIG. 10). The communication module 720 may be a wireless local area network (WLAN) such as Wi-Fi, a wireless personal area network (WPAN) such as Bluetooth, a wireless Universal Serial Bus (USB), ZigBee, near-field communication (NFC), radio frequency identification (RFID), or a wireless communication block capable of exchanging data via a mobile communication system.

The firmware 721 may provide an application programming interface (API) to the IoT device application 710 and may control the wireless baseband chipset 722 based on the control of the IoT device application 710. The wireless baseband chipset 722 may provide a connection to a wireless communication network.

The secure module 723 may include a processor 723_1 and a secure element (SE) 723_2. The SE 723_2, similar to the secure storage 122 in FIG. 1, may store the security information (e.g., the first and second security information SI1 and SI2 in FIG. 1) to authenticate the IoT device 700 for a connection to the wireless communication network. The processor 723_1, similar to the controller 121 in FIG. 1, may receive the security data from the mutually authenticated server based on the unique information of the secure module 723, and may generate the security information from the security data and store the generated security information in the SE 723_2.

Figure 11:
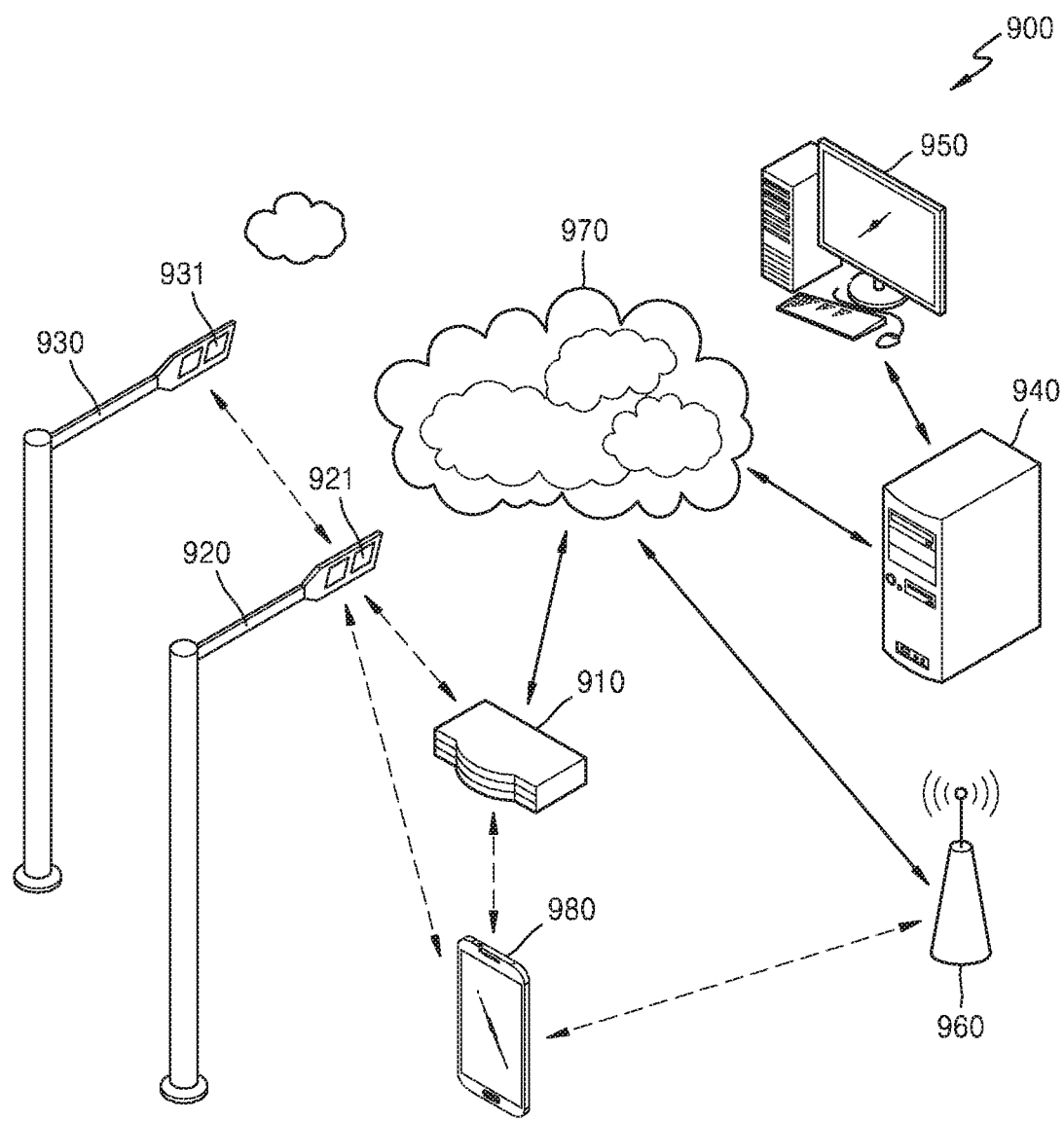
FIG. 11 is a diagram illustrating a network system in which an apparatus including a secure component according to an example embodiment is used.

FIG. 11 is a diagram illustrating a network system 900 in which an apparatus including a secure component according to an example embodiment is used. Referring to FIG. 11, the network system 900 may include a communication connection device 910, a plurality of lighting devices 920 and 930, a server 940, a computer 950 to manage the server 940, a communication base station 960, a communication network 970, and a mobile device 980, which are capable of communicating with the communication connection device 910.

The plurality of lighting devices 920 and 930 installed in an outdoors space such as a street and a park may respectively include smart engines 921 and 931, respectively. Each of the smart engines 921 and 931 may include a sensor and a communication module to collect information about the surrounding environment, and communicate with other peripheral devices according to communication protocols, such as Wi-Fi, ZigBee, and Li-Fi. For example, the smart engine 921 may be connected to the smart engine 931 for communication, and Wi-Fi extension technology (or Wi-Fi mesh technology) may be used for communication between the smart engines 921 and 931. The smart engine 921 may be connected to the communication connection device 910 connected to the communication network 970 via the wired/wireless communication. For high communication efficiency, two or more smart engines (e.g., the smart engines 921 and 931) as a group may be connected to the communication connection device 910.

Each of the smart engines 921 and 931 may include the unique information of the lighting devices 920 and 930. The unique information stored in each of the smart engines 921 and 931 may be different from each other. The mutual authentication with another entity, for example, the server 940, may be performed based on the unique information after the lighting devices 920 and 930 may be installed according to an embodiment, and then the security information may be provisioned into the smart engines 921 and 931.

The communication connection device 910 may include an access point capable of wired/wireless communication, and may mediate communication between the communication network 970 and other devices. The communication connection device 910 may be connected to the communication network 970 via at least one of wire/wireless methods, and may be structurally stored, for example, in any one of the lighting devices 920 and 930.

The communication connection device 910 may be connected to the mobile device 980 via a communication protocol such as Wi-Fi, and may relay communication between the smart engines 921 and 931 and the mobile device 980. The user of the mobile device 980 may receive peripheral environment information collected by the smart engines 921 and 931 via the communication connection device 910 connected to the smart engine 921 of the lighting device 920 in the neighborhood. The communication device 910 may be connected to the communication network 970 via the communication base station 960 by a wireless cellular communication method such as 3G or 4G.

The server 940 connected to the communication network 970 may receive information collected by the smart engines 921 and 931 of the lighting devices 920 and 930 via the communication connection device 910, and may simultaneously monitor operation conditions of the lighting devices 920 and 930. The server 940 may be connected to the computer 950 that provides a management system to manage each of the lighting devices 920 and 930 based on monitoring results of the operating conditions of the lighting devices 920 and 930. According to an example embodiment, the server 940, similar to the server 200 in FIG. 1, may perform mutual authentication with the smart engines 921 and 931, and may provide the security data to the smart engines 921 and 931. The computer 950 may execute software or the like that may monitor and manage the operating conditions of the lighting devices 920 and 930 via the smart engines 921 and 931.

As described above, example embodiments have been disclosed in the drawings and specification. While the example embodiments have been described herein with reference to specific terms, it should be understood that they have been used only for the purpose of describing the technical idea of the present disclosure and not for limiting the scope of the present disclosure as defined in the claims. Therefore, it will be clearly understood by one of ordinary skill in the art that various modifications and equivalent embodiments are possible without departing from the scope of the present disclosure. Accordingly, the true scope of protection of the inventive concept should be determined by the technical idea of the following claims.

What is claimed is:

1. An apparatus into which security information is provisioned through communication with a server, the apparatus comprising:

a communication interface configured to receive security data from the server; and a secure component comprising a secure storage and a controller configured to store the security information in the secure storage based on the security data, wherein the communication interface comprises:

a presentation layer handler configured to perform mutual authentication between the apparatus and the server according to a first encryption protocol based on unique information assigned to the secure component, and an application layer handler configured to request and receive, according to a second encryption protocol, the security data from the server that is mutually authenticated according to the first encryption protocol.

2. The apparatus of claim 1, wherein the first encryption protocol is a transport layer security (TLS) protocol, and wherein the presentation layer handler is further configured to perform the mutual authentication according to a TLS handshake.

3. The apparatus of claim 2, wherein the unique information is provisioned into the secure component during a production process of the secure component and comprises at least one of a certificate and a key pair.

4. The apparatus of claim 1, wherein the second encryption protocol is an enrollment over security transport (EST) protocol.

5. The apparatus of claim 1, wherein the security data comprises at least one of a new certificate and a new key pair.

6. The apparatus of claim 1, wherein the controller is further configured to generate a key pair comprising a public key and a private key, and wherein the application layer handler is further configured to:

transmit to the server a certificate signing request (CSR) comprising the public key, and receive a new certificate as the security data from the server.

7. The apparatus of claim 6, wherein the controller is further configured to generate the security information from the new certificate and the key pair.

8. A method of provisioning security information into an apparatus, which includes a secure component, through communication with a server, the method comprising:

obtaining unique information that is assigned to the secure component;

performing mutual authentication between the apparatus and the server based on the unique information according to a first encryption protocol;

requesting, according to a second encryption protocol, security data from the server that is mutually authenticated according to the first encryption protocol;

receiving the security data from the server according to the second encryption protocol; and storing the security information in the secure component based on the received security data.

9. The method of claim 8, wherein the first encryption protocol is a transport layer security (TLS) protocol and the mutual authentication is performed by using a TLS handshake.

10. The method of claim 9, wherein the unique information includes at least one of a certificate and a key pair.

11. The method of claim 8, wherein the second encryption protocol is an enrollment over security transport (EST) protocol.

12. The method of claim 8, wherein the unique information is provisioned into the secure component during a production process of the secure component.

13. The method of claim 8, wherein the security data includes at least one of a new certificate and a new key pair.

14. The method of claim 8, wherein the requesting the security data comprises:

generating a key pair including a public key and a private key; and transmitting a certificate signing request (CSR) including the public key to the server, and wherein the receiving the security data comprises receiving a new certificate as the security data from the server.

15. The method of claim 14, wherein the storing the security information comprises generating the security information from the new certificate and the key pair.

16. A method of provisioning security information into an apparatus through communication between a server and the apparatus, the method comprising:

preparing, by the server, security data;

mutually authenticating the server and the apparatus according to a first encryption protocol based on unique information assigned to a secure component included in the apparatus;

requesting, by the apparatus that is mutually authenticated according to the first encryption protocol, for the security data according to a second encryption protocol;

transmitting, by the server, the security data to the apparatus according to the second encryption protocol; and storing, by the apparatus, the security information in the secure component based on the security data.

17. The method of claim 16, wherein the first encryption protocol is a transport layer security (TLS) protocol and the second encryption protocol is an enrollment over security transport (EST) protocol.

18. The method of claim 16, wherein the preparing the security data comprises:

obtaining at least one of a new certificate and a new key pair; and generating the security data from the at least one of the new certificate and the new key pair.

19. The method of claim 16, wherein the preparing the security data comprises:

receiving, from the apparatus, a certificate signing request (CSR) that includes a public key; and generating a new certificate as the security data based on the CSR.

20. The method of claim 16, wherein the unique information is provisioned into the secure component during a production process of the secure component.

* * * * *